United States Patent [19]
Masuda et al.

[11] Patent Number: 5,773,517
[45] Date of Patent: Jun. 30, 1998

[54] PROCESS FOR THE PRODUCTION OF THERMOPLASTIC RESIN COMPOSITION

[75] Inventors: Haruhisa Masuda; Takashi Oku; Tsugunori Kashimura, all of Kurashiki, Japan

[73] Assignee: Kuraray Co., Ltd., Kurashiki, Japan

[21] Appl. No.: 849,243

[22] PCT Filed: Oct. 14, 1996

[86] PCT No.: PCT/JP96/02962

§ 371 Date: Jun. 11, 1997

§ 102(e) Date: Jun. 11, 1997

[87] PCT Pub. No.: WO97/13801

PCT Pub. Date: Apr. 17, 1997

[30] Foreign Application Priority Data

Oct. 12, 1995 [JP] Japan .................................... 7-264276

[51] Int. Cl.$^6$ .................................................... C08L 67/02
[52] U.S. Cl. ............................ 525/90; 525/91; 525/92 F; 525/177
[58] Field of Search ............................ 525/90, 91, 92 F, 525/177

[56] References Cited

U.S. PATENT DOCUMENTS

| | | | |
|---|---|---|---|
| 3,723,574 | 3/1973 | Brinkmann | 525/177 |
| 4,287,313 | 9/1981 | Uber | 525/91 |
| 4,804,711 | 2/1989 | Ishihara | 525/91 |
| 4,845,188 | 7/1989 | Peters | 525/354 |
| 4,851,474 | 7/1989 | Willis | 525/92 |
| 5,122,553 | 6/1992 | Takayama | 523/514 |
| 5,264,491 | 11/1993 | Quirk | 525/177 |
| 5,314,954 | 5/1994 | Ohishi | 525/132 |
| 5,393,837 | 2/1995 | Kinoshita | 525/92 |
| 5,428,068 | 6/1995 | McBain | 523/522 |

*Primary Examiner*—Patricia A. Short
*Attorney, Agent, or Firm*—Oblon, Spivak, McClelland, Maier & Neustadt, P.C.

[57] ABSTRACT

A process for producing thermoplastic resin compositions, comprises mixing under melting conditions a polyester resin (I) and an addition polymer (II) having on one end thereof 0.5 to 1 group of a functional group capable of reacting with polyester resins in a ratio by weight between the former and the latter of 97/3 to 20/80 and then solid phase polymerizing the mixture, to obtain a thermoplastic resin composition comprising:

[1] a high molecular polyester resin (I') derived from said polyester resin (I), [2] said addition polymer (II) having on one end thereof 0.5 to 1 group of a functional group capable of reacting with polyester resins, and [3] a block copolymer (III) comprising a polyester block (i) derived from said polyester resin (I) and a polymer block (ii) derived from said addition polymer (II);

in said thermoplastic resin composition the ratio between {the sum of the weight of said polyester resin (I') and the weight of said polyester block (i) contained in said block copolymer (III)} and {the sum of the weight of said addition polymer (II) and the weight of said polymer block (ii) contained in said block copolymer (III)} being 97/3 to 20/80 and the molar ratio between said block copolymer (III) and said addition polymer (II) being at least 20/80. The thermoplastic resin compositions obtained by this process, having good compatibility with a variety of polymers, are useful as resin improving agents, such as compatibility improving agents and quality improving agents.

8 Claims, No Drawings

PROCESS FOR THE PRODUCTION OF THERMOPLASTIC RESIN COMPOSITION

TECHNICAL FIELD

The present invention relates to a process for producing thermoplastic resin compositions. The thermoplastic resin compositions obtainable by the process of the present invention have excellent compatibility with a variety of polymers. The compositions are therefore useful as resin improving agents, e.g. compatibility improving agents that can make compatible different polymers, which are originally incompatible with each other, and give homogeneous polymer alloys therefrom. The compositions are also useful as quality improving agents for resins to improve various properties of other polymers, such as impact strength, tensile strength, elongation, heat resistance, paintability, weather resistance, elasticity, resilience, flowability, dimensional stability and chemical resistance.

BACKGROUND ART

Technology for modifying existing polymers is more advantageous than that for developing new polymers based on molecular design, because of far less cost and shorter time required. The modification technology is therefore under vigorous research in the fields of automobile parts, electric and electronic material parts and the like. This technology mainly uses modification agents, and there have been desired better resin improving agents, such as compatibility improving agents used for producing polymer alloys comprising at least two polymer components and quality improving agents for improving specific properties of polymers.

However, there have been available very few resin modifying agents having good compatibility with a variety of polymers. Attempts to modify, in particular, a polyester resins (or polymer alloys containing a polyester as one costituent), have produced no sufficient results, since such attempts have encountered problems such as nonuniformity and inter-phase delamination due to poor compatibility.

To solve these problems, for example U.S. Pat. Nos. 4,923,956 and 4,839,423 propose use of a polystyrene to the side chain of which ethylglycidyl methacrylate has added or a polymethacrylate to the side chains of which ethylglycidyl methacrylate has added. However, these modifying agents are not very effective for polyester resins and, moreover, usually require a complex synthesis process.

Japanese Patent Application Laid-open No. 199127/1990 proposes, as a modifying agent for polyester resins, a reaction product of an aromatic vinyl polymer having carboxyl group on at least one end thereof and a polymer being compatible with polyesters and having hydroxyl group on at least one end thereof. The Application also proposes a reaction product of an aromatic vinyl polymer having hydroxyl group or amino group on at least one end thereof and a polymer being compatible with polyesters and having carboxyl group on at least one end thereof. The present inventors made the following test. That is, according to the process described in Example of Japanese Patent Application Laid-open No. 199127/1990, polybutylene terephthalate was, under melting condition, mixed with a polystyrene having hydroxyl group on one end thereof and dehydration was conducted. The obtained reaction product was evaluated for the effect of improving compatibility for a polybutylene terephthalate/polystyrene polymer alloy. No sufficient improvement of compatibility was then observed.

Japanese Patent Application Laid-open No. 161043/1989 discloses a process for producing polyester resin compositions, which comprises melt kneading polyethylene terephthalate with polyethylene and/or a modified polyethylene having side chain-carboxyl groups and then solid phase polymerizing the kneaded product. EP 333414 discloses a process for producing improved thermoplastic polyester resins, which comprises melt kneading a thermoplastic polyester with a modified olefin comprising an olefin graft-polymerized with an unsaturated carboxylic acid and then heating the mixture in a solid state. The products obtained by these processes, each being a graft copolymer, have insufficient compatibility with other polymers.

U.S. Pat. No. 3,723,574 discloses that a polyester-based block copolymer is obtained by melt kneading a polyester resin with a polystyrene butadiene diol and then solid phase polymerizing the kneaded product. The block copolymer obtained principally comprises a multi-block body of at least tri-block body due to the starting material polystyrene butadiene diol having hydroxyl groups on both ends, and hence has insufficient compatibility with other polymers.

Accordingly, an object of the present invention is to provide a process for producing thermoplastic resin compositions which are useful as resin improving agents, e.g. compatibility improving agents that can make compatible different polymers which are incompatible with each other, thereby providing homogeneous polymer alloys and quality improving agents that can improve the properties of other polymers, such as impact strength, tensile strength, elongation, heat resistance, paintability, weather resistance, elasticity, resilience, flowability, dimensional stability and chemical resistance.

DISCLOSURE OF THE INVENTION

The present inventors had found that polyester compositions comprising a polyester and a specific block copolymer having terminal hydroxyl group in a specific ratio (see the specifications of U.S. Pat. Nos. 5,393,837 and 5,439,976) have excellent impact strength. Then, the present inventors made a further study to solve the above problems and found the following facts and completed the invention. That is, mixing under melting conditions a polyester resin and an addition polymer having on its one end 0.5 to 1 group of a functional group capable of reacting with polyester resins and solid phase polymerizing the resulting mixture can yield a thermoplastic resin composition having excellent compatibility with a variety of polymers and being useful as a resin improving agent.

The present invention provides a process for producing thermoplastic resin compositions, which comprises the successive steps of:

mixing under melting conditions a polyester resin (I) and an addition polymer (II) having on one end thereof 0.5 to 1 group of a functional group capable of reacting with polyester resins [hereinafter this addition polymer is sometimes referred to as "addition polymer (II)"] in a ratio by weight between the former and latter of 97/3 to 20/80, and solid phase polymerizing the mixture, to obtain a thermoplastic resin composition comprising:
[1] a high molecular polyester resin (I') [hereinafter sometimes referred to as "polyester resin (I')"] derived from said polyester resin (I),
[2] said addition polymer (II) having on one end thereof 0.5 to 1 group of a functional group capable of reacting with polyester resins, and
[3] a block copolymer (III) [hereinafter sometimes referred to as "block copolymer (III)"] comprising a polyester block (i) derived from said polyester resin (I) and a polymer block (ii) derived from said addition polymer (II);

in said thermoplastic resin composition the ratio between {the sum of the weight of said polyester resin (I') and the weight of said polyester block (i) contained in said block copolymer (III)} and {the sum of the weight of said addition polymer (II) and the weight of said polymer block (ii) contained in said block copolymer (III)} being 97/3 to 20/80 and the molar ratio between said block copolymer (III) and said addition polymer (II) being at least 20/80.

The present invention also provides the thermoplastic resin composition obtained by the above process and, further, a resin modifying agent comprising said thermoplastic resin composition.

BEST MODE FOR CARRYING OUT THE INVENTION

In the present invention, it is necessary to use a polyester resin (I) and an addition polymer (II) having on its one end 0.5 to 1 group of a functional group capable of reacting with polyester resins in a ratio by weight between the former and the latter of 97/3 to 20/80. With the ratio exceeding 97/3, the resulting thermoplastic resin composition has poor compatibility with other polymers. With the ratio being less than 20/80, the resulting thermoplastic resin has poor heat resistance. The ratio by weight between the polyester resin (I) and the addition polymer (II) is desirably in a range of 95/5 to 30/70 in view of the heat resistance and compatibility with other polymers of the resulting thermoplastic resin composition.

Any thermoplastic polyester resin can be used as the polyester resin (I) in the present invention. Examples of such resins are polyethylene terephthalate resin (hereinafter sometimes referred to as "PET resin"), polybutylene terephthalate resin (hereinafter sometimes referred to as "PBT resin"), polyethylene naphthalate resin, polybutylene naphthalate resin, poly-1,4-cyclohexanedimethylene terephthalate resin, polycaprolactone resins, p-hydroxybenzoic acid-based polyester resins and polyallylate resins.

Among the above polyester resins, it is preferred to use, as the polyester resin (I), PET resin or PBT resin, which leads to better compatibility with other polymers.

The polyester resin (I) may, as necessary, contain not more than 30 mole % based on total constituent units of dicarboxylic acid units other than the dicarboxylic acid units constituting the basic structure (for example with PET resin and PBT resin, terephthalic acid units; and with polyethylene naphthalate resin and polybutylene naphthalate resin, naphthalenedicarboxylic acid units) and diol units other than the diol units constituting the basic structure (for example with PET resin, ethylene glycol units; and with PBT resin, 1,4-butanediol units).

Examples of the other dicarboxylic acid units which may be contained in the polyester resin (I) are those derived from: aromatic dicarboxylic acids, e.g. terephthalic acid, isophthalic acid, phthalic acid, 2,6-naphthalenedicarboxylic acid, 1,5-naphthalenedicarboxylic acid, bis(p-carboxyphenyl) methane, anthrathenedicarboxylic acid, 4,4'-diphenyletherdicarboxylic acid and sodium 5-sulfoisophthalate; aliphatic dicarboxylic acids, e.g. adipic acid, sebacic acid, azelaic acid and dodecanedioic acid; alicyclic acids, e.g. 1,3-cyclohexanedicarboxylic acid and 1,4-cyclohexanedicarboxylic acid; and ester-forming derivatives (lower alkyl ester such as methyl ester and ethyl ester and like esters) of the foregoing. The polyester resin (I) may contain as the other dicarboxylic acid units only one or at least 2 types of the above dicarboxylic acid units.

Examples of the other diol units which may be contained in the polyester resin (I) are those derived from: aliphatic diols having 2 to 10 carbon atoms, e.g. ethylene glycol, propylene glycol, 1,4-butanediol, neopentyl glycol, 2-methylpropanediol and 1,5-pentanediol; alicyclic diols, e.g.cyclohexanedimethanol and cyclohexanediol; and polyalkylene glycols having a molecular weight of not more than 6,000, e.g. diethylene glycol, polyethylene glycol, poly-1,3-propylene glycol and polytetramethylene glycol. The polyester resin (1) may contain as the other diol units only one or at least 2 types of the above diol units.

The polyester resin (I) may further contain not more than 1 mole % based on total constituent units of structural units derived from tri- or more functional monomers, such as glycerine, trimethylolpropane, pentaerythrithol, trimellitic acid and pyromellitic acid.

It is desirable that the polyester resin (I) have an intrinsic viscosity, as determined from measurements in a 1/1 by weight phenol/tetrachloroethane mixed solvent at 30° of 0.3 to 1.5 dl/g.

Examples of the functional group capable of reacting with polyester resins, that can be possessed by the addition polymer (II) used in the present invention, are hydroxyl group, carboxyl group, ester groups, amide groups, amino groups, epoxy group, thiol group and thioester groups. The addition polymer (II) can be produced by a process which comprises polymerizing, with use of an initiator having the above functional group, a monomer which will constitute the addition polymer, a process which comprises permitting an addition polymer having an active terminal such as carboanion to add to a terminator having the functional group, or like processes.

The addition polymer (II) has a functional group capable of reacting with polyester resins, on one of the molecular ends of the addition polymer (II). This causes the resulting block copolymer (III) to comprise principally a di-block body consisting of a polyester block derived from the polyester resin (I) and a polymer block derived from the addition polymer (II). Use of an addition polymer having the functional group in the molecular chain or on the side chains will lead to formation of graft copolymers, so that the compatibility with other polymers worsens. Use of an addition polymer having the functional group on both molecular ends will principally produce tri- or more multi- block bodies, which also worsens the compatibility with other polymers.

The content of the functional group capable of reacting with polyester resins and present on one of the ends of the addition polymer (II) is 0.5 to 1 group per molecule, on an average. If the content deviates from the above range, the resulting thermoplastic resin composition will have poor compatibility with other polymers. If an addition polymer (II) has no functional group capable of reacting with polyester resins at all, no block copolymer (III) will be formed, so that the compatibility with other polymers becomes insufficient. From the viewpoint of providing the resulting thermoplastic resin composition with better compatibility with other polymers, the addition polymer (II) preferably contains 0.7 to 1 group of the functional group capable of reacting with polyester resins.

As the addition polymer (II), any one of addition polymers derived from a single monomer, addition-polymerized random copolymers from a plurality of monomers and addition-polymerized block copolymers from a plurality of monomers may be used. However, the following addition polymers are preferred in view of better compatibility with other polymers.

① addition-polymerized block copolymer (II-1) comprising: a polymer block (A) comprising at least one block selected from the group consisting of a polymer block (a-1) principally comprising aromatic vinyl compound units [hereinafter sometimes referred to as "aromatic vinyl polymer block (a-1)"] and a hydrogenated polybutadiene block (a-2) having less than 30% of 1,2-bond [hereinafter sometimes referred to as "hydrogenated polybutadiene block (a-2)"], and a polymer block (B) comprising at least one block selected from the group consisting of a hydrogenated polyisoprene block (b-1) [hereinafter sometimes referred to as "hydrogenated polyisoprene block (b-1)"] and a hydrogenated isoprene/butadiene copolymer block (b-2) [hereinafter sometimes referred to as "hydrogenated isoprene/butadiene block (b-2)"], and having on its one end 0.5 to 1 group of a functional group capable of reacting with polyester resins [hereinafter this is sometimes referred to as "addition-polymerized block copolymer (II-1)"];

② a polyolefin resin (II-2) having on its one end 0.5 to 1 group of a functional group capable of reacting with polyester resins [hereinafter this is sometimes referred to as "polyolefin resin (II-2)"]; and ③ an aromatic vinyl resin (II-3) having on its one end 0.5 to 1 group of a functional group capable of reacting with polyester resins [hereinafter this is sometimes referred to as "aromatic vinyl resin (II-3)"].

As the addition-polymerized block copolymer (II-1), those having on one end thereof hydroxyl group, carboxyl group or amino group are preferably used. Example of such copolymers having hydroxyl group are represented by the following general formulas (1) through (4).

(A—B)s—OH (1)

(B—A)t—OH (2)

A—(B—A')u-OH (3)

B'—(A—B)w—OH (4)

wherein A and A' each represents a polymer block (A), B and B' each represents a polymer block (B), s, t, u and w each represents an integer of 1 or more and OH represents hydroxyl group.

With the addition-polymerized block copolymer (II-1) the number of repetition, s, t, u and w, of polymer block (A) and polymer block (B) can be optionally selected, but is preferably in a range of 1 to 5.

Preferred addition-polymerized block copolymers (II-1) are, in view of improving compatibility with other polymers, those addition-polymerized di-block copolymers and tri-block copolymers that are represented by the following formulas (5) and (6), respectively,

B—A—OH (5)

wherein A represents polymer block (A), B represents polymer block (B) and OH represents hydroxyl group;

A—B—A'—OH (6)

wherein A and A' each represents polymer block (A), B represents polymer block (B) and OH represents hydroxyl group.

The aromatic vinyl polymer block (a-1) that can become a constituent block of the polymer block (A) in the addition-polymerized block copolymer (II-1) is a polymer block consisting essentially of aromatic vinyl compound units. Examples of the aromatic vinyl compound which gives the aromatic vinyl compound units in the aromatic vinyl polymer block (a-1) are styrene, α-methylstyrene, o-methylstyrene, m-methylstyrene, p-methylstyrene, 2,4-dimethylstyrene, vinylnaphthalene and vinylanthracene. Among these, styrene and α-methylstyrene are preferred in view of compatibility with polyester resins (I). The aromatic vinyl polymer block (a-1) may be constituted of a single group of aromatic vinyl compound units or 2 or more groups of aromatic vinyl compound units.

The hydrogenated polybutadiene block (a-2) which can become a constituent block of the polymer block (A) in the addition-polymerized block copolymer (II-1) is a polybutadiene block with less than 30%, preferably not more than 25%, of 1,2-bond and with its unsaturated bonds partly or entirely converted into saturated bonds by hydrogenation. The polybutadiene constituting the hydrogenated polybutadiene block (a-2) has, before hydrogenation, less than 30 mole %, preferably not more than 25 mole %, of vinyl ethylene group [—CH(CH=CH$_2$)—CH$_2$—; butadiene units with 1,2-bond], with the rest being 2-butene-1,4-diyl group [—CH$_2$—CH=CH—CH$_2$—; butadiene units with 1,4-bond].

The hydrogenated polyisoprene block (b-1) which can become a constituent block of the polymer block (B) in the addition-polymerized block copolymer (II-1) is a polymer block comprising a polyisoprene block principally comprising monomer units from isoprene and having its unsaturated bonds partly or entirely converted into saturated bonds by hydrogenation. With the hydrogenated polyisoprene block (b-1), before hydrogenation, the units from isoprene are at least one group of units selected from the group consisting of 2-methyl-2-butene-1,4-diyl group [—CH$_2$—C(CH$_3$)=CH—CH$_2$—; isoprene unit with 1,4-bond], isopropenylethylene group [—CH(C(CH$_3$)=CH$_2$)—CH$_2$—; isoprene unit with 3,4-bond] and 1-methyl-1-vinylethlene group [—C(CH$_3$)(CH=CH$_2$)—CH$_2$—; isoprene units with 1,2-bond].

The hydrogenated isoprene/butadiene copolymer block (b-2) which can become a constituent block of the polymer block (B) in the addition-polymerized block copolymer (II-1) is an isoprene/butadiene copolymer block consisting essentially of units from isoprene and units from butadiene and has its unsaturated bonds partially or entirely converted into saturated bonds by hydrogenation. With the hydrogenated isoprene/butadiene copolymer block (b-2), before hydrogenation, the units from isoprene are at least one group of units selected from the group consisting of 2-methyl-2-butene-1,4-diyl group, isopropenylethylene group and 1-methyl-1-vinylethylene group. The units from butadiene are 2-butene-1,4-diyl group and/or vinylethylene group. The ratio of these groups in the isoprene/butadiene copolymer block before hydrogenation is not specifically limited. In the hydrogenated isoprene/butadiene copolymer block (b-2), units from isoprene and units from butadiene may assume any configuration such as random, block-wise or tapered block-wise.

The condition of the hydrogenation of the hydrogenated polybutadiene block (a-2), hydrogenated polyisoprene block (b-1) and hydrogenated isoprene/butadiene copolymer block (b-2) in the addition-polymerized block copolymer (II-1) may be either partial or entire hydrogenation. However, it is desirable that at least 50%, in particular at least 80%, of the carbon-carbon double bonds of the butadiene units and/or isoprene units in the addition-polymerized block copolymer (II-1) be hydrogenated (that is, the degree of unsaturation be not more than 50%, in particular not more than 20%) which provides the block copolymer (III) formed therefrom having good resistance to heat degradation and weather and further protects the resulting thermoplastic resin composition from becoming tacky.

It is desirable that the ratio between the total weight of polymer block (A) and that of polymer block (B) in the addition-polymerized block copolymer (II-1) be in a range of 1/9 to 9/1, more preferably in a range of 2/8 to 7/3, which insures good heat resistance of the thermoplastic resin composition and increases its resin improving effect.

It is desirable that the polymer block (A) in the addition-polymerized block copolymer (It-1) have a number average molecular weight of 2,500 to 50,000 and that the polymer block (B) in the addition-polymerized block copolymer (II-1) have a number average molecular weight of 10,000 to 100,000. It is further desirable that the addition-polymerized block copolymer (II-1) itself have a number average molecular weight of 12,500 to 150,000. Either only one type or 2 or more types of the addition-polymerized block copolymer (II-1) may be used.

The polyolefin resin (II-2) which may be used as the addition polymer (II) includes α-olefin-based resins having on one end thereof a functional group capable of reacting with polyester resins. Examples of the α-olefin deriving the α-olefin units which constitute the resin are ethylene, propylene, 1-butene, 4-methyl-1-pentene, 1-hexene and 1-octene. Examples of the α-olefin-based resins are homopolymers, e.g. high density polyethylene, medium density polyethylene, low density polyethylene, polypropylene, poly-1-butene and poly(4-methyl-1-pentene); and addition-polymerized random copolymers or addition-polymerized block copolymers, e.g. ethylene/propylene copolymer, ethylene/1-butene copolymer, ethylene/1-hexene copolymer and ethylene/1-octene copolyer. Among these, high density polyethylene, medium density polyethylene, low density polyethylene and polypropylene are preferred. In this description, the term polypropylene, for example, means an α-olefin-based resin consisting essentially of propylene units and includes, besides propylene homopolymer, those addition-polymerized random copolymers and addition-polymerized block copolymers that contain small amounts of α-olefin units other than propylene units, such as ethylene units and 1-butene units.

The functional group capable of reacting with polyester resins and possessed by the polyolefin resin (II-2) is preferably hydroxyl group, carboxyl group or thiol group; and the polyolefin resin (II-2) is preferably a polypropylene having on its one end 0.5 to 1 group of hydroxyl group or a polypropylene having on its one end 0.5 to 1 group of thiol group. The polyolefin resin (II-2) desirably has a number average molecular weight of 5,000 to 1,000,000.

The aromatic vinyl resin (II-3) which may be used as the addition polymer (II) comprises monomer units principally comprising aromatic vinyl compound units. Examples of the aromatic vinyl compound which gives the aromatic vinyl compound units in this resin are styrene, α-methylstyrene, o-methylstyrene, m-methylstyrene, p-methylstyrene, 2,4-dimethylstyrene, vinylnaphthalene and vinylanthracene. Among these, styrene and α-methylstyrene are preferred. The aromatic vinyl resin (II-3) may be constituted of a single group of aromatic vinyl compound units or 2 or more groups of aromatic vinyl compound units.

The functional group capable of reacting with polyester resins and possessed by the aromatic vinyl resin (II-3) is preferably hydroxyl group, carboxyl group or amino group. Then, the aromatic vinyl resin (II-3) is more preferably a polystyrene having on its one end 0.5 to 1 group of hydroxyl group, a polystyrene having on its one ends 0.5 to 1 group of carboxyl group, or a polystyrene having on its one ends 0.5 to 1 group of amino group. The aromatic vinyl resin (II-3) desirably has a number average molecular weight of 5,000 to 1,000,000.

In the present invention, it is necessary to mix under melting conditions the above polyester resin (I) and addition polymer (II) and then solid phase polymerize the mixture. The block copolymer (III) comprising the polyester block (i) derived from the polyester resin (I) and the polymer block (ii) derived from the addition polymer (II) is formed by reaction of the polyester resin (I) or high molecular polyester resin (I') derived therefrom and the addition polymer (II), or by achieving a higher molecular weight after the reaction. Here, simply mixing under melting conditions the polyester resin (I) and the addition polymer (II) forms the block copolymer (III) in a small amount so that the resulting thermoplastic resin composition does not exhibit a very good compatibility with other polymers. It is solid phase polymerization effected after mixing under melting conditions the polyester resin (I) and addition polymer (II) that permits the reaction of the polyester resin (I) or high molecular polyester resin (I') derived therefrom and the addition polymer (II) to proceed efficiently, thereby providing the resulting thermoplastic resin composition with good compatibility with other polymers. The present inventors have also found that, for the formation of the block copolymer (III), the mixing state on solid phase polymerization of the polyester resin (I) or high molecular polyester resin (I') derived therefrom and the addition polymer (II) plays an important role. That is, on solid phase polymerization, islands-wise dispersion of the polyester resin (I) or high molecular polyester resin (I') derived therefrom in the matrix of the addition polymer (II) leads to the most efficient formation of the block copolymer (III). This mixing state is formed by dispersing, during the mixing under melting conditions, the polyester resin (I) in the matrix of the addition polymer (II). To achieve this, it is recommended to select the types and molecular weights of the polyester resin (I) and the addition polymer (II) such that the melt viscosities $(MV_I)$ and $(MV_{II})$ of the polyester resin (I) and the addition polymer (II), respectively, will satisfy the following formula (7)

$$MV_I \geq MV_{II} \tag{7}$$

and to adjust the melting temperature and shear rate during the melt mixing.

The polyester resin (I) and addition polymer (II) can be mixed under melting conditions with a kneader such as single-screw extruder, twin-screw extruder, conventional kneader or Banbury mixer. The mixing conditions can be suitably selected according to the type of the polyester resin (I) and apparatus used and the mixing is generally conducted at 180° to 300° C. for 3 to 15 minutes.

On the above solid phase polymerization, at first the resin composition obtained by mixing the polyester resin (I) and addition polymer (II) is solidified and granulated. The obtained granules are transferred to a solid phase polymerization reactor. After drying and crystallization at a temperature of 120° to 180° C. as preliminary treatment, solid phase polymerization is conducted. The solid phase polymerization is generally effected at a temperature 5 to 60° C. lower than the melting point of the polyester resin (I) and in an inert gas flow or under vacuum for 1 to 50 hours. The solid phase polymerization reactor may be of either batch type or continuous type. The residence time, treating temperature and like conditions are suitably adjusted to the desired degree of polymerization and conversion.

The above procedure gives the thermoplastic resin composition having good compatibility with other polymers. The thermoplastic resin composition comprises the high molecular polyester resin (I') derived from the polyester resin (I) on the above solid phase polymerization, the addition polymer (II), and the block copolymer (III). In the thermoplastic resin composition, the ratio between {the sum of the weight of the polyester resin (I') and the weight of the polyester blocks (i) contained in the block copolymer (III)} and {the sum of the weight of the addition polymer (II) and the weight of the polymer blocks (ii) contained in the block copolymer (III)} is in a range of 97/3 to 20/80, preferably in a range of 95/5 to 30/70. With this ratio exceeding 97/3, the compatibility of the thermoplastic resin composition with other polymers worsens. With the ratio being less than 20/80, the heat resistance of the thermoplastic resin composition worsens.

Further in the thermoplastic resin composition obtained by the present invention, the molar ratio between the block copolymer (III) and the addition polymer (II) is at least 20/80 and preferably in a range of 20/80 to 99/1, more preferably in a range of 30/70 to 90/10. With this ratio being less than 20/80, the compatibility of the thermoplastic resin composition with other polymers worsens. The thermoplastic resin composition of the present invention can, by comprising the polyester resin (I'), addition polymer (II) and block copolymer (III) in the above ratio, possess also good heat resistance.

The thermoplastic resin compositions obtained by the present invention may contain reinforcing agent such as glass fiber and its surface treating agent, antioxidant, thermal decomposition preventing agent, ultraviolet absorber, crystallization nucleus agent such as talc, crystallization promoting agent, color, flame retardant, filler, releasing agent, plasticizer, antistatic agent, hydrolysis preventing agent, adhesion assistant, tacky adhesive, polymers other than the above and the like, either singly or in combination of 2 or more.

The thermoplastic resin compositions, having excellent compatibility with a variety of polymers, are useful as compatibility improving agents for polymer alloys with at least 2 different polymers. Especially, they have excellent compatibility improving effect for polymer alloys having as one component polyester resins, polycarbonate resins, polyamide resins or the like. They are, in particular, excellent as compatibility improving agents for polymer alloys having as one component a polyester resin, such as polyester resin/polyolefin resin, polyester resin/addition-polymerized block copolymer, polyester resin/ABS resin, polyester resin/polyamide resin, polyester resin/polycarbonate resin, polyester resin/polyphenylene ether resin, polyester resin/thermoplastic elastomer resin, polyester resin/polystyrene resin and polyester resin/other polyester resin.

The thermoplastic resin compositions obtained by the present invention are also useful as improving agents for the impact strength and elongation of polyester resins; the impact strength, paintability, weather resistance, elongation and chemical resinstance of polyolefin resins, particularly polypropylene resins; the elongation, chemical resistance and impact strength of ABS resins; the low temperature impact strength, paintability, elasticity, tensile strength, flowability and chemical resistance of polycarbonate resins; the impact strength, elasticity, tensile strength and dimensional stability of polyamide resins; the impact strength, paintability and chemical resistance of polyphenylene ether resins, and the impact strength, elasticity, tensile strength, elongation and resilience of ionomers. In particular, the thermoplastic resin compositions of the present invention are excellent as improving agents for polyester resins, polycarbonate resins, polyphenlene ether resins and ionomers.

Moreover, the thermoplastic resin compositions obtained by the present invention are also usable as filler dispersing agents to be used when an inorganic filler is finely dispersed in a polymer.

On using the thermoplastic resin compositions obtained according to the present invention as the above resin improving agents such as compatibility improving agents, quality improving agents or filler dispersing agents, there can be employed, for example, a process which comprises melt kneading with one or 2 or more polymers simultaneously, a process which comprises melt kneading with a mixture of 2 or more polymers or like processes.

Hereinbelow, the present invention is described concretely by reference to Examples, which are by no means limitative of the invention.

A polybutylene terephthalate (HAUZER S1000F made by Kuraray Co., Ltd.; intrinsic viscosity [Θ]=0.85; melt viscosity at 250° C., 100 sec$^{-1}$: 2,000 poises) was used as the polyester resin (I).

The following polymers were used as the addition polymer (II).

SEEPS-OH: A tri-block body having hydroxyl group on the end of one of polystyrene blocks, comprising polystyrene block (number average molecular weight: 6,000)/hydrogenated 1,3-butadiene-polyisoprene copolymer block (number average molecular weight: 28,000)/polystyrene block (number average molecular weight: 6,000) (hydroxyl group content: 0.8 group/molecule; styrene content based on the block copolymer before hydrogenation: 30% by weight; molar ratio of isoprene units/1,3-butadiene units: 1/1; ratios of 1,4-bonds and 3,4-bonds present in the 1,3-butadiene units in the 1,3-buta-diene-isoprene block copolymer block before hydrogenation: 95% and 5%, respectively; degree of unsaturation of the hydrogenated 1,3-butadiene-polyisoprene copolymer, based on the block: 5%; number average molecular weight: 40,000; melt viscosity at 250° C., 100 sec$^{-1}$: 900 poises).

EPS-OH: A di-block body having hydroxyl group on the end of polystyrene block, comprising hydrogenated polyisoprene block (number average molecular weight: 20,000)/polystyrene block (number average molecular weight: 10,000) (hydroxyl group content: 0.8 group/molecule; styrene content based on the block copolymer before hydrogenation: 33% by weight; degree of unsaturation based on the hydrogenated polyisoprene block: 5%; number average molecular weight: 30,000; melt viscosity at 250° C., 100 sec$^{-1}$: 800 poises).

PP-SH: A polypropylene having thiol group on its one end [number average molecular weight: 10,000; thiol group content: 0.7 group/molecule; melt viscosity at 250° C., 100 sec$^{-1}$: could not be determined (flow)].

PS-OH: A polystyrene having hydroxyl group on its one end [number average molecular weight: 15,000; hydroxyl group content: 0.8 group/molecule; melt viscosity at 250° C., 100 sec$^{-1}$: could not be determined (flow)].

EXAMPLE 1

There were preliminarily mixed 70 parts by weight of previously dried polybutylene terephthalate and 30 parts by weight of SEEPS-OH. The mixture was then melt kneaded through a twin-screw extruder (TEX 44C, made by Nihon Steel Corp.) at 250° C., to yield pellets. The pellets were transferred to a solid phase polymerization apparatus equipped with a gas inlet, a vent, a vacuum connector and like items and subjected to preliminary treatment at 120° C. for about 4 hours for drying and crystallization. Thereafter, the inside pressure of the reaction vessel was reduced to about 0.2 mmHg and the temperature was elevated to 200° C., to initiate solid phase polymerization. After about 14 hours, the inside pressure was permitted to return to atmospheric pressure with nitrogen, to obtain a thermoplastic resin composition.

EXAMPLES 2 through 4

Melt kneading and solid phase polymerization were conducted in the same manner as in Example 1 except that EPS-OH (Example 2), PP-SH (Example 3) or PS-OH (Example 4) was used instead of SEEPS-OH, to obtain thermoplastic resin compositions.

Comparative Example 1

A separable flask was charged with 70 parts by weight of polybutylene terephthalate and 30 parts by weight of PS-OH. Dehydrogenation was conducted at 240° C. in a nitrogen flow for 12 hours, to obtain a thermoplastic resin composition.

The results of analyses on the thermoplastic resin compositions obtained in Examples 1 through 4 and Comparative Example 1 are shown in the following Table 1.

state of dispersion in an SEM (JSM-T100, made by JEOL). The state in which dispersed particles have a fine particle diameter was judged as good compatibility. The SEM observation was conducted on specimens obtained by breaking the polymer alloy samples in liquid nitrogen or on such specimens from which one polymer component had been dissolved out through the rupture surface.

Preparation of test specimens

The pellets of the resin composition obtained in each Application Example or pellets of polycarbonate were used as molding materials. The pellets were formed, with an 80-ton injection molding machine made by Nissei Resin Industry Co. at a cylinder temperature of 275° C. and a die temperature of 40° C., into specimens for testing impact strength (size: length×thickness×width=64 mm×12.7 mm×3.2 mm), specimens for modulus of elasticity and paintability (size: length×thickness×width=128 mm×12.7 mm×6.4 mm), and dumb-bell specimens for tensile yield strength and tensile elongation at break.

Impact strength

The specimens prepared above were tested for notched Izod impact strength in accordance with JIS K7110 with an Izod impact tester (made by Toyo Seiki Seisakusho Co.) at 23° C. and −20° C.

Modulus of elasticity (flexural modulus of elasticity)

The above prepared specimens were tested for flexural modulus of elasticity in accordance with JIS K7203 with an AUTOGRAPH (made by Shimadzu Corp.).

TABLE 1

|  |  |  | Example 1 | Example 2 | Example 3 | Example 4 | Comparative Example 1 |
|---|---|---|---|---|---|---|---|
| Starting materials | Polyester resin (I) | PBT (parts by weight) | 70 | 70 | 70 | 70 | 70 |
|  | Addition polymer (II) | SEEPS-OH (parts by weight) | 30 |  |  |  |  |
|  |  | EPS-OH (parts by weight) |  | 30 |  |  |  |
|  |  | PP-SH (parts by weight) |  |  | 30 |  |  |
|  |  | PS-OH (parts by weight) |  |  |  | 30 | 30 |
| Thermoplastic resin composition | Composition | Polyester resin (I') (parts by weight) | 50 | 43 | 10 | 25 | 69 |
|  |  | Addition polymer (II) (parts by weight) | 10 | 10 | 15 | 13 | 29 |
|  |  | Block copolymer (III) (parts by weight) | 40 | 47 | 75 | 62 | 2 |
|  | Ratio between {total weight of polyester resin (I') and polyester block (i) contained in block copolymer (III)} and {total weight of addition polymer (II) and polymer block (ii) contained in block copolymer (III)} |  | 70/30 | 70/30 | 70/30 | 70/30 | 70/30 |
|  | Molar ratio between block copolymer (III) and addition polymer (II) |  | 66/34 | 66/34 | 50/50 | 56/44 | 3/97 |
|  | Matrix resin constituting thermoplastic resin composition |  | SEEPS-OH | EPS-OH | PP-OH | PS-OH | PBT |

The examples of using the thermoplastic resin compositions of the present invention as resin improving agents are shown below. In the Application Examples that follow, evaluation of compatibility, preparation of test specimens, tests for impact strength, modulus of elasticity, tensile yield strength and tensile elongation at break, and evaluation of paintability were conducted in the following manner.

Evaluation of compatibility

The polymer alloys obtained in the Application Examples below were evaluated for the compatibility by observing the Tensile yield strength and tensile elongation at break The above prepared specimens were tested for tensile yield strength and tensile elongation at break in accordance with JIS K7113 with an AUTOGRAPH (made by Shimadzu Corp.).

Evaluation of paintability

A polyurethane paint was applied on the surface of the specimens prepared above and cured at 110° C. for 1 hour. Thereafter, knife lines were drawn with a sharp knife on the cured film, to make 100 squares of 1 mm×1 mm. A Cellophane adhesive tape was pressed on the film and then peeled therefrom abruptly. The paintability was evaluated by the ratio between the number of unpeeled squares and the total number of 100.

Application Example 1

There were preliminarily mixed 80 parts by weight of polybutylene terephthalate (HAUZER S1000, made by Kuraray Co.), 20 parts by weight of polypropylene (K5019, made by Chisso Corp.) and 10 parts by weight of the thermoplastic resin composition obtained in Example 1. The mixture was then melt kneaded through a twin-screw extruder (TEX 44C made by Nihon Steel Corp.) at 250° C., to give a polymer alloy.

Application Example 2

There were preliminarily mixed 80 parts by weight of polyethylene terephthalate (KURAPET KS750R, made by Kuraray Co.), 20 parts by weight of polypropylene (K5019, made by Chisso Corp.) and 10 parts by weight of the thermoplastic resin composition obtained in Example 3. The mixture was then melt kneaded through a twin-screw extruder (TEX 44C made by Nihon Steel Corp.) at 280° C., to give a polymer alloy.

Application Example 3

There were preliminarily mixed 80 parts by weight of polybutylene terephthalate (HAUZER S1000, made by Kuraray Co.), 20 parts by weight of a modified polyphenylene ether (NORYL 731, made by Nippon G.E. Plastic Co.) and 20 parts by weight of the thermoplastic resin composition obtained in Example 2. The mixture was then melt kneaded through a twin-screw extruder (TEX 44C made by Nihon Steel Corp.) at 250° C., to give a polymer alloy.

Application Example 4

There were preliminarily mixed 70 parts by weight of polybutylene terephthalate (HAUZER S1000, made by Kuraray Co.), 30 parts by weight of polystyrene (STYRON XG805, made by Asahi Chemical Industries Co.) and 20 parts by weight of the thermoplastic resin composition obtained in Example 4. The mixture was then melt kneaded through a twin-screw extruder (TEX 44C made by Nihon Steel Corp.) at 250° C., to give a polymer alloy.

Application Example 5

There were preliminarily mixed 80 parts by weight of polycarbonate (NOVAREX 7025A, made by Mitsubishi Chemical Industries Co.), 20 parts by weight of polypropylene (K5019, made by Chisso Corp.) and 10 parts by weight of the thermoplastic resin composition obtained in Example 1. The mixture was then melt kneaded through a twin-screw extruder (TEX 44C made by Nihon Steel Corp.) at 270° C., to give a polymer alloy.

Comparative Application Example 1

Application Example 1 was repeated except that the thermoplastic resin composition obtained in Example 1 was not used, to obtain a polymer alloy.

Comparative Application Example 2

Application Example 2 was repeated except that the thermoplastic resin composition obtained in Example 3 was not used, to obtain a polymer alloy.

Comparative Application Example 3

Application Example 3 was repeated except that the thermoplastic resLn composition obtained in Example 2 was not used, to obtain a polymer alloy.

Comparative Application Example 4

Application Example 4 was repeated except that the thermoplastic resin composition obtained in Example 4 was not used, to obtain a polymer alloy.

Comparative Application Example 5

There were preliminarily mixed 70 parts by weight of polybutylene terephthalate (HAUZER S1000, made by Kuraray Co.), 30 parts by weight of polystyrene (STYRON XG805, made by Asahi Chemical Industries Co.) and 20 parts by weight of the thermoplastic resin composition obtained in Comparative Example 1. The mixture was then melt kneaded through a twin-screw extruder (TEX 44C made by Nihon Steel Corp.) at 250° C., to give a polymer alloy.

Comparative Application Example 6

Application Example 5 was repeated except that the thermoplastic resin composition obtained in Example 1 was not used, to obtain a polymer alloy.

The results of evaluation of Application Examples 1 through 5 and Comparative Application Examples 1 through 6 are shown in Table 2.

TABLE 2

|  |  |  | Application Example | | | | | Comp. Application Example | | | | | |
|---|---|---|---|---|---|---|---|---|---|---|---|---|---|
|  |  |  | 1 | 2 | 3 | 4 | 5 | 1 | 2 | 3 | 4 | 5 | 6 |
| Starting materials | Polymer A | Polybutylene terephthalate | 80 |  | 80 | 70 |  | 80 |  | 80 | 70 | 70 |  |
|  |  | Polyethylene terephthalate |  | 80 |  |  |  |  | 80 |  |  |  |  |
|  |  | Polycarbonate |  |  |  |  | 80 |  |  |  |  |  | 80 |
|  | Polymer B | Polypropylene | 20 | 20 |  |  | 20 | 20 | 20 |  |  |  | 20 |
|  |  | Modified polyphenylene ether |  |  | 20 |  |  |  |  | 20 |  |  |  |
|  |  | Polystyrene |  |  |  | 30 |  |  |  |  | 30 | 30 |  |
|  | Improving agent (*) | Thermoplastic resin composition obtained in Example 1 | 10 |  |  |  | 10 |  |  |  |  |  |  |
|  |  | Thermoplastic resin composition obtained in Example 2 |  |  | 20 |  |  |  |  |  |  |  |  |
|  |  | Thermoplastic resin composition obtained in Example 3 |  | 10 |  |  |  |  |  |  |  |  |  |

TABLE 2-continued

|  | Application Example | | | | | Comp. Application Example | | | | | |
|---|---|---|---|---|---|---|---|---|---|---|---|
|  | 1 | 2 | 3 | 4 | 5 | 1 | 2 | 3 | 4 | 5 | 6 |
| Thermoplastic resin composition obtained in Example 4 |  |  |  | 20 |  |  |  |  |  |  |  |
| Thermoplastic resin composition obtained in Comparative Example 1 |  |  |  |  |  |  |  |  |  | 20 |  |
| Average particle diameter (μm) of polymer B dispersed in the matrix of polymer A | 0.2 | 0.2 | 1.2 | 0.4 | 0.4 | 5 | 6 | 3 | 2 | 1.6 | 6 |
| Evaluation of compatibility | ○ | ○ | ⊚ | ○ | ○ | x | x | x | Δ | Δ | x |

○: excellent (average particle diameter of polymer B: less than 0.5 μm)
⊚: good (average particle diameter of polymer B: at least 0.5 μm and less than 1.5 μm)
Δ: poor (average particle diameter of polymer B: at least 1.5 μm and less than 3.0 μm)
x: very poor (average particle diameter of polymer B: at least 3.0 μm)
(*): compatibility improving agent It is understood from Table 2 above that the polymer alloys of Application Examples 1 through 5 using the thermoplastic resin compositions obtained according to the present invention have finer particle diameters of dispersed particles than the polymer alloys of Comparative Application Examples 1 through 6, thus showing better compatibility.

Application Examples 6 through 9

There were melt kneaded polycarbonate (PANLITE L1225, made by Teijin Kasei Co.) and the thermoplastic resin composition obtained Example 1 or Example 2 in a ratio by weight as shown in Table 3 through a twin-screw extruder (TEX 44C made by Nihon Steel Corp.) at 270° C., to obtain pellets of resin compositions. Test specimens were prepared from the pellets in the above-described manner and tested for impact strength at room temperature, impact strength at -20° C., flexural modulus of elasticity, tensile yield strength, tensile elongation at break and paintability in accordance with the above-described methods. The results are shown in Table 3 below.

Comparative Application Example 7

Test specimens were prepared from pellets of a polycarbonate (PANLITE L1225, made by Teijin Kasei Co.) in the above-described manner and tested for impact strength at room temperature, impact strength at -20° C., flexural modulus of elasticity, tensile yield strength, tensile elongation at break and paintability in accordance with the above-described methods. The results are shown in Table 3 below.

It is understood from Table 3 above that the resin compositions of Application Examples 6 through 9 using the thermoplastic resin compositions obtained according to the present invention have better impact strength at low temperature, flexural modulus of elasticity, tensile yield strength, tensile elongation at break and paintability than the polycarbonate of Comparative Application Example 7.

INDUSTRIAL APPLICABILITY

The thermoplastic resin compositions obtained in accordance with the present invention, having good compatibility with a variety of polymers, are useful as resin improving agents, e.g. compatibility improving agents that can make compatible different polymers which are incompatible with each other, thereby providing homogeneous polymer alloys and quality improving agents that can improve the properties of other polymers, such as impact resistance, tensile strength, elongation, heat resistance, paintability, weather resistance, elasticity, resilience, flowability, dimensional stability and chemical resistance.

We claim:
1. A process for producing thermoplastic resin compositions, which comprises the successive steps of:
   mixing under melting conditions a polyester resin (I) and an addition polymer (II) having on only one end thereof 0.5 to 1 group of a functional group capable of reacting with polyester resin in a ratio by weight between the former and the latter of 97/3 to 20/80, and
   solid phase polymerizing the mixture,
   to obtain a thermoplastic resin composition comprising:

TABLE 3

|  |  |  | Application Example | | | | Comparative Application Example 7 |
|---|---|---|---|---|---|---|---|
|  |  |  | 6 | 7 | 8 | 9 |  |
| Starting materials | Polycarbonate |  | 90 | 80 | 90 | 80 | 100 |
|  | Thermoplastic resin composition obtained in Example 1 |  | 10 | 20 |  |  |  |
|  | Thermoplastic resin composition obtained in Example 2 |  |  |  | 10 | 20 |  |
| Properties of resin composition | Notched Izod impact strength (kJ/m²) | 23° C. | 77 | 79 | 78 | 78 | 77 |
|  |  | -20° C. | 70 | 77 | 79 | 73 | 67 |
|  | Flexural modulus of elasticity (GPa) |  | 2.32 | 2.34 | 2.21 | 2.28 | 1.96 |
|  | Tensile yield strength (MPa) |  | 61 | 58 | 59 | 61 | 51 |
|  | Tensile elongation at break (%) |  | 92 | 88 | 90 | 89 | 85 |
|  | Paintability |  | 35/100 | 100/100 | 40/100 | 100/100 | 0/100 |

(1) a high molecular polyester resin (I') derived from said polyester resin (I), (2) said addition polymer (II) having on only one end thereof 0.5 to 1 group of a functional group capable of reacting with polyester resins, and (3) a di-block copolymer (III) consisting essentially of a polyester block (i) derived from said polyester resin (I) and a polymer block (ii) derived from said addition polymer (II);

in said thermoplastic resin composition the ratio between the sum of the weight of said polyester resin (I') and the weight of said polyester block (i) contained in said block copolymer (III) and the sum of the weight of said addition polymer (II) and the weight of said polymer block (ii) contained in said block copolymer (III) being 97/3 to 20/80 and the molar ratio between said block copolymer (III) and said addition polymer (II) being at least 20/80.

2. The process according to claim 1, wherein said addition polymer (II) iA an addition-polymerized block copolymer (II-1) comprising a polymer block (A) comprising at least one block selected from the group consisting of a polymer block (a-1) principally comprising aromatic vinyl compound units and a hydrogenated polybutadiene block (a-2) having less than 30% of 1,2-bond, and a polymer block (B) comprising at least one block selected from the group consisting of hydrogenated polyisoprene block (b-1) and hydrogenated isoprene/butadiene copolymer block (b-2); and having on its one end 0.5 to 1 group of a functional group capable of reacting with polyester resins.

3. The process according to claim 1, wherein said addition polymer (II) is a polyolefin resin (II-2) having on its one end 0.5 to 1 group of a functional group capable of reacting with polyester resins.

4. The process according to claim 1, wherein said addition polymer (II) is an aromatic vinyl resin (II-3) having on its one end 0.5 to 1 group of a functional group capable of reacting with polyester resins.

5. The process according to claim 1, wherein said polyester resin is polyethylene terephthalate resin or polybutylene terephthalate resin.

6. The process according to claim 1, wherein said polyester resin (I) is, during mixing under melting conditions, dispersed in the matrix of said addition polymer (II).

7. A thermoplastic resin composition obtained by the process according to claim 2.

8. A resin modifying agent comprising the thermoplastic resin composition according to claim 7.

* * * * *